(12) United States Patent
Tompkin et al.

(10) Patent No.: US 6,870,678 B2
(45) Date of Patent: Mar. 22, 2005

(54) SURFACE PATTERN

(75) Inventors: Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 121 days.

(21) Appl. No.: 10/221,987

(22) PCT Filed: Jan. 12, 2001

(86) PCT No.: PCT/EP01/00319
§ 371 (c)(1), (2), (4) Date: Sep. 18, 2002

(87) PCT Pub. No.: WO01/80175
PCT Pub. Date: Oct. 25, 2001

(65) Prior Publication Data
US 2004/0057113 A1 Mar. 25, 2004

(30) Foreign Application Priority Data
Apr. 15, 2000 (CH) .................................. 751/00

(51) Int. Cl.⁷ ................................................ G02B 5/18
(52) U.S. Cl. .................. 359/569; 359/566; 359/558
(58) Field of Search ............................... 359/566, 567, 359/569, 572, 558

(56) References Cited

U.S. PATENT DOCUMENTS 5,886,798 A * 3/1999 Staub et al. .................... 359/2
6,369,947 B1 * 4/2002 Staub et al. ................. 359/574

FOREIGN PATENT DOCUMENTS

| CH | 678 835 A5 | 11/1991 |
|---|---|---|
| DE | 195 16 741 A1 | 11/1996 |
| EP | 0 105 099 A1 | 4/1984 |
| EP | 0 330 738 A1 | 9/1989 |
| EP | 0 375 833 A1 | 7/1990 |
| EP | 0 712 012 A1 | 5/1996 |
| WO | WO 87/07034 | 11/1987 |
| WO | WO 98/26373 | 6/1998 |
| WO | WO 99/38038 | 7/1999 |
| WO | WO 99/38039 | 7/1999 |

OTHER PUBLICATIONS

R. Staub, W. R. Tompkin, A. Schilling, 'Gratings of constantly varying depth for visual security devices', Opt. Eng., vol. 38, No. 1, Jan. 1999, pp. 89–98.*

W. R. Tompkin, A. Schilling, C. Weiteneder, H. P. Herzig, 'Zero–order gratings for optically variable devices', Proc. SPIE, vol. 4677, Apr. 2002, pp. 227–237.*

* cited by examiner

*Primary Examiner*—Thong Nguyen
*Assistant Examiner*—Arnel C. Lavarias
(74) *Attorney, Agent, or Firm*—Hoffmann & Baron, LLP (57) ABSTRACT

A surface pattern (18) is in the form of a visually visible mosaic comprising a number of surface portions (8; 9; 15; 16; 17) and is embedded in a laminate (1) comprising at least a transparent cover layer (2) and a protective layer (5). The surface portions (8; 9; 15; 16; 17) are transparent, scatter or reflect incident light (10) or diffract the incident light (10) at microscopic relief structures (4). The surface portions (8; 9; 15; 16; 17) are at least partially covered with a reflection layer (3). At least one of the surface portions occupied by a microscopic relief structure (4), an area (16), is a ZOM-structure (4') with a predeterminedly slowly varying profile height h and a spatial frequency f, wherein the product of a predetermined limit wavelength $\lambda_G$ of the visible spectrum and the spatial frequency f is greater than or equal to one.

20 Claims, 5 Drawing Sheets

SURFACE PATTERN

This application claims priority based on PCT Application No. PCT/EP01/00319, filed on Jan. 12, 2001 and Swiss Patent Application No. 751/00, filed on Apr. 15, 2000.

BACKGROUND OF THE INVENTION

The invention relates to a surface pattern with a visually visible mosaic which includes a number of surface portions embedded in a laminate of at least a transparent cover layer and a protective layer.

Such surface patterns have a microscopically fine relief structure and are suitable as security elements for enhancing the level of security against forgery of value-bearing papers or securities and bonds, passes, payment means and other valuable articles.

A surface pattern of the kind set forth in the classifying portion of claim 1 is known from WO 87/07034. The surface pattern has three surface portions with an optically effective diffraction structure. Those structures with a spatial frequency f diffract visible light according to its wavelength x at different diffraction angles a. The profile height h of the grooves of the three structures is constant in each surface portion, but it is established differently in each surface portion in such a way that, for a given observer, the first structure diffracts blue light, the second structure green light and the third structure red light, with in each case a vanishing or minimum level of diffraction efficiency. When the surface pattern is tilted about an axis which is parallel to the grooves of the structures, the first surface portion will appear dark at a first viewing angle, the second surface portion will appear dark at a second viewing angle and the third surface portion will appear dark at a third viewing angle, that is to say from the point of view of the observer the dark surface portion abruptly changes in position as the surface pattern is continuously tilted. The spatial frequency f is limited upwardly as the optical effect described here is observable in the first diffraction order.

WO 98/26373 (which subsequently issued as U.S. Pat. No. 6,369,947) describes a surface pattern with diffraction gratings with a light-dark pattern, the extent of which changes with the viewing angle. The profile heights h of the gratings change in accordance with a modulation function. The spatial frequencies f are so selected that at least a first diffraction order occurs.

EP 0 712 012 A1 describes a surface pattern which includes an element with a diffraction structure coated with a lacquer, with a spatial frequency f of more than 2000 lines/mm. It is pointed out that, for such spatial frequencies, because of total reflection at the lacquer-air-interface, visible light diffracted at the diffraction structure, even in the first diffraction order, remains trapped in the lacquer layer. The diffraction structure is produced through a mask by means of an anisotropic etching process. The profile heights h depend on the size of the openings in the mask or the duty ratio of the transparent and opaque surfaces and are only statistically established by virtue of the etching process. Because of imponderables in the etching process a predetermined pattern cannot be precisely converted into the diffraction structure. A holographic copy of the diffraction structure has a similar diffraction performance to the original which—because it is itself imprecisely defined—scarcely differs from the copy, from the point of view of a lay person.

On the other hand EP 0105 099 B1, EP 0 330 738 B1 and EP0 375 833 B1 disclose surface patterns with surface portions which are assembled in a mosaic, with various diffraction structures which are visible in dependence on the tilt angle and/or angle of rotation and which show a sequence of patterns or images. The surface patterns which have an optical diffraction effect are embedded between layers of transparent plastic materials (Swiss patent specification No 678 835).

SUMMARY OF THE INVENTION

The object of the present invention is to provide a forgery-proof and copying-proof diffraction structure which by virtue of a high spatial frequency has a clearly recognizable pattern.

That object is attained with the characterizing features of claims 1–11. Advantageous configurations are set forth in the appendant claims.

BRIEF DESCRIPTION OF THE DRAWINGS

Embodiments of the invention are described in greater detail hereinafter by way of example with reference to the drawing in which.

DESCRIPTION OF THE PREFERRED EMBODIMENTS

Figure 1:
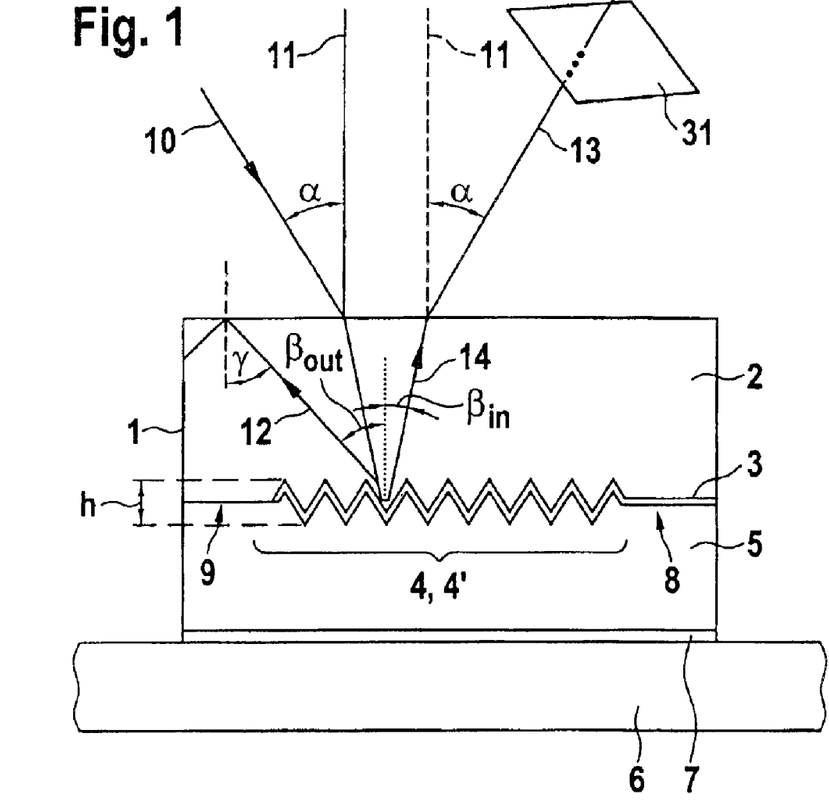
FIG. 1 is a view in cross-section of a laminate.

In FIG. 1, reference 1 denotes a laminate, 2 denotes a transparent cover layer comprising a polymer, 3 denotes a reflection layer, 4 denotes a microscopic relief is structure, 1 denotes a protective layer comprising a polymer and 6 denotes a substrate. The surface of the protective layer 5, which is remote from the reflection layer 3, is either covered with an adhesive layer 7 or the protective layer itself performs the function of the adhesive. Cold or hot melt adhesives are suitable as the adhesive, the choice depends on the use involved. The microscopic relief structure 4 is formed into the cover layer 2 and covered with the reflection layer 3 while the unstructured surface portions 8 and 9 are covered, as mirror surfaces 8, with the reflection layer 3, or, as transparent windows 9, remain free of the reflection layer 3. Either the protective layer 5 is recognizable through the windows 9 or, if the protective layer 5 is also transparent, indicia of the substrate 6 are visible under the laminate 1.

The microscopic relief structure 4 is an optically effective grating with parallel straight or curved grooves and at least locally involves a periodic structure which is described by the parameters thereof. The most important parameters are an azimuth angle relative to a particular direction, a spatial frequency f or a number of grooves per millimeter, a relief profile shape, 30 and a profile height h. The geometrical profile height $h_G$ within the microscopic relief structure 4 is not to be confused with the optically effective profile height h. If the material of the cover layer 2 of the refractive index n fills the grooves of the relief structure 4, the geometrical profile height $h_G$ multiplied by the refractive index n becomes optically effective as the profile height h. Hereinafter, the profile height h always means the optically effective profile height h.

The wavelengths perceived by the human eye cover a range of 380 nm (violet) to 780 nm (red).

A light beam 10 which is incident on the microscopic relief structure 4 at an angle α on the laminate 1 is partially reflected and diffracted at the reflection layer 3. As the cover layer 2 has a typical refractive index of n 1.5, the incident light beam 10 is refracted in relation to a perpendicular 11 on to the surface of the cover layer 2 before it impinges on the microscopic relief structure 4 and is diffracted. The diffracted light 12 leaves the microscopic relief structure 4, in accordance with the diffraction order, with the reflected light beam 14 leaving the laminate 1 in the zero diffraction order, in the direction 13 of the reflected light. The other diffraction orders include additional angles β relative to the reflected light beam 14, wherein those additional angles β are given by the function sin β=m·λ·f+sin ($β_{IN}$), provided that m denotes the number of the diffraction order, λ denotes the wavelength of the incident light beam 10 and f denotes the spatial frequency of the relief structure 4. As soon as the diffracted light 12 impinges on the interface of the cover layer 2 relative to the air at an angle γ of more than arcsin (1/n), the diffracted light 12 is totally reflected and issues from the laminate 1 only after a plurality of reflections, in directions which can no longer be defined. However, as soon as the product of a limit wavelength $λ_G$ and the spatial frequency f is greater than or equal to 1, no more diffraction occurs. The limit wavelength $λ_G$ depends on the light source provided for observation. If observation under daylight conditions is involved, the limit wavelength $λ_G$ is advantageously selected to be in the violet part of the visible spectrum, for example $λ_G$=380 nm. That determines the minimum spatial frequency f as 2,630 per mm.

In contrast, light is very well reflected at the reflection layer 3, in which respect differences in height within the microscopic relief structure 4 cause path length differences and thus phase differences between the light beams 14 reflected at adjacent points. Interference between the reflected light beams 14 with the phase differences influences the intensity of the light in dependence on the wavelength λ. Therefore, from that white light, the light of given wavelengths λ are amplified, reduced or even extinguished. The microscopic relief structure 4 in which there is no longer any diffraction but only the effect of interference can still be observed in the zero diffraction order is referred to as a 'zero order microstructure' or ZOM. Hereinafter, the microscopic relief structures 4 which satisfy the condition X·f≧1 are referred to as ZOM-structures 4'. A surface which is occupied by the ZOM-structure 4' and involves a profile height h which is constant over the surface, appears in the grey value or color determined by the profile height h and the material of the reflection layer 3, upon illumination of the laminate 1 with white light in a light beam 10 incident from one direction. When the surface is tilted about an axis in the plane of the surface in contrast the optically effective profile height h changes and therewith the color, the color shade or the grey value. In the case of normal diffuse illumination, the incident light 10 is incident on the microscopic relief structure 4 over the entire half-space over the laminate 1 and leaves the laminate in the same distribution into the half-space. In the case of selected ZOM-structures 4', an observer sees the surface in a color which is dependent on the tilt angle but not the azimuth. The ZOM-structures 4' with a rectangular profile stand out due to rich colors and are also known from nature, an example in this respect is the colored wings of butterflies of the Morphus family.

The ZOM structure 4' has a line spacing 1/f which is less than the wavelength λ of the visible light. Scalar theory cannot even qualitatively describe the diffraction behavior of the ZOM-structure 4', only an application of the exact electromagnetic theory and precise calculations as are described in the book 'Electromagnetic Theory of Gratings' by R Petit, editor, Springerverlag, Heidelberg 1980. In accordance therewith, scalar theory fails because the behavior of light is completely different in accordance with TE- and TM-polarization.

In the case of TE-polarization in which the electrical field is oriented parallel to the grooves of the ZOM-structure 4', surface currents flow in the reflection layer 3 in such a way that the ZOM-structure 4' can act like a mirror and reflects the light back in the direction of the reflected beam 14. Stated in heuristic terms, the TE-field does not penetrate into the ZOM-structure and does not experience the action of the ZOM-structure. A ZOM-structure 4' in metal with a profile height h of between 0 and 350 nm or more has a fairly constant level of reflectivity, irrespective of the profile height h.

In the case of TM-polarization in which the electrical field is oriented perpendicularly to the grooves of the ZOM-structure 4', the surface currents cannot be so easily produced in the reflection layer 3. The TM-field can advance into the depth of the ZOM-structure and is only there reflected. The result is that, in the region of the profile height h of 0 to about 350 rim, the reflectivity of the ZOM-structure 4' in metal decreases substantially with increasing profile height h.

In contrast to the usual diffraction structures with the condition λ·f<1, the color of the ZOM-structures 4', which can be perceived under a given observation condition, has not been derived from the diffraction equations. The color of the ZOM-structures 4' depends on the materials, the profile shape, the profile height h, the orientation and so forth and is generally not a spectral color. When using metallic reflection layers 3, grey or metallic color shades appear upon illumination of the ZOM structures 4' with white light. With crossed gratings, the formation of surface currents can be suppressed, in which case the ZOM-structures 4' reflect only still a little light. Such ZOM-structures 4' with a metallic reflection layer 3 appear black from all angles of view. Dielectric reflection layers 3 behave differently. Upon rotation about the perpendicular 11, the ZOM-structure 4' with the dielectric reflection layer 3 exhibits color shading effects or color changes which are dependent on the azimuth.

The advantage of those ZOM-structures 4' with λ·f≧1 is that the observer always sees a colored or grey-shaded surface, irrespective of the observation conditions, quite in contrast to a mosaic consisting of surface portions with the known diffraction gratings, as are described in abovementioned documents EP 0 105 099 B1, EP 0 330 738 B1 and EP 0 375 833 B1.

If the microscopic relief structure 4 does not have a periodic structure but is of dimensions which are greater than the wavelength t of the incident light, no diffraction occurs; however the light is scattered. By means of a suitable profile shape, the light is scattered in a preferred direction. A scattering surface portion without a preferred direction appears to the observer as a grey surface, independently of the azimuth; a scattering surface portion with a preferred direction is perceived as a light or a dark surface, depending on the observation direction.

Figure 2:
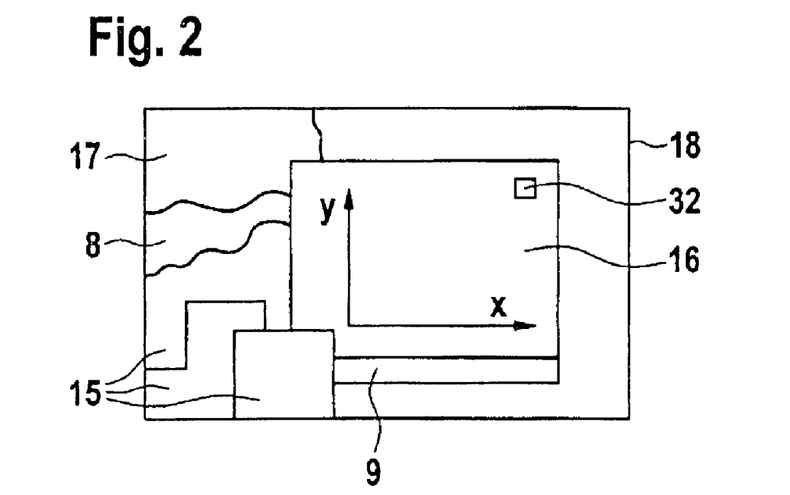
FIG. 2 is a diagrammatically sub-divided surface pattern.

FIG. 2 shows a surface pattern 18 subdivided into a plurality of surface portions 8, 9, 15, 16, 17. The optical-diffraction surfaces 15 have grating structures with the condition $\lambda \cdot f < 1$ and differ at least in terms of azimuth and spatial frequency f. In contrast in an area 16 defined by co-ordinates x and y, the microscopic relief structure 4 satisfies the condition $\lambda \cdot f \geq 1$. For the observer, due to the mutually juxtaposed surface portions 8, 9, 15, 16, 17, the result is a striking interaction, caused by the completely different optical behavior upon tilting and rotary movement of the mirror surfaces 8, the windows 9, the optical-diffraction surfaces 15, the area 16 with the ZOM-structure 4' (FIG. 1) and scattering surface portions 17. In the surface pattern 18, the areas 16 serve for example as reference surfaces for the optical-diffraction surfaces 15 or vice-versa while the scattering surface portions 17 are suitable for register-accurate markings.

Figure 3A:
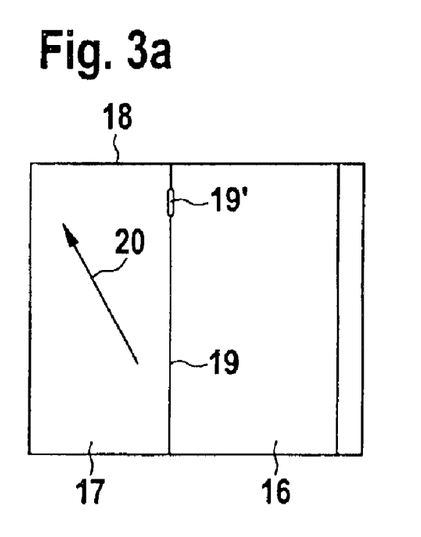
FIGS. 3a and 3b show the simple surface pattern.
Figure 3B:
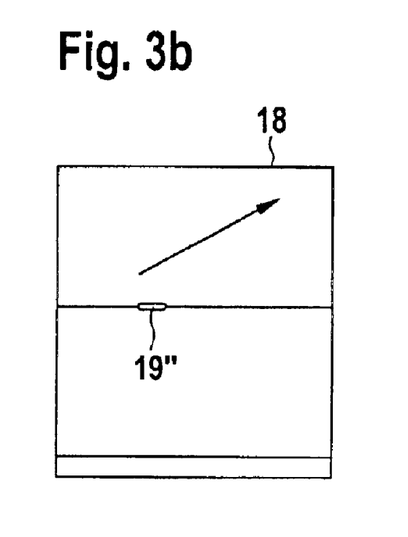

In FIG. 3a, the simplest embodiment of the surface pattern 18 embraces at least the scattering surface portion 19 and the area 16 which are advantageously arranged in mutually juxtaposed relationship with a common boarder 19. The ZOM-structure 4' (FIG. 1) in the area 16 is a sine function with a metallic reflection layer 3 (FIG. 1) and a profile height h (FIG. 1) which changes from h=0 to about h=300 nm over a distance of several millimeters monotonically along the border 19. With diffuse illumination, the scattering surface portion 17 also has a preferential direction 20 so that the scattering surface portion 17 achieves a given grey value by rotation and tilting of the surface pattern 18 about its three axes, so that at a position 19' on the border 19, the ZOM-structure 4' and the scattering surface portion 17 have the same grey value and the contrast disappears at the position 19'. After an azimuthal rotation of the surface pattern 18, for example as shown in FIG. 3b, the grey values or metallic color shades in both surface portions 16 and 17 have altered for the observer so that the contrast disappears at another position 19" on the border. A locally, slowly varying profile height h in the area 16 affords features which are difficult to copy but which nonetheless can be easily verified by an observer.

Figure 4:
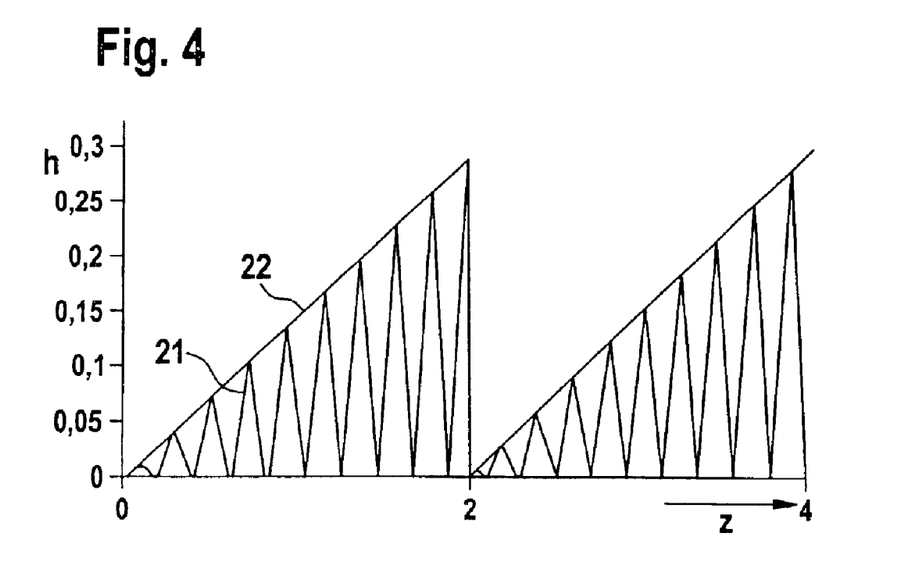
FIG. 4 shows a profile of a relief structure.

FIG. 4 shows a profile 21 S(z) of the ZOM-structure 4' (FIG. 1). The profile 21 is based on a sinusoidal grating structure $G(z)=0.5 \cdot A \cdot [1+\sin(2\pi fz)]$ of the amplitude A. The profile height h of the grating structure is modulated with a function H(z). The profile height h changes within the area 16 (FIG. 3) along a particular direction z, for example with a linear function H(z). The particular direction z is oriented for example parallel to the grating vector of the grating structure G(z). An envelope curve 22, that is to say the function H(z), is for example of a periodic sawtooth shape and is composed of a plurality of linear portions, wherein the function H assumes values of the profile height h between h=0 nm and a maximum. The ZOM-structure 4' thus has a profile 21 of the function $S(z)=G(z) \cdot H(z)$. A special case of that function is given if the function, in an area 16, only assumes the values of a single period on the path z between an edge portion of the area 16 to an oppositely disposed edge portion of the area 16.

Figure 5:
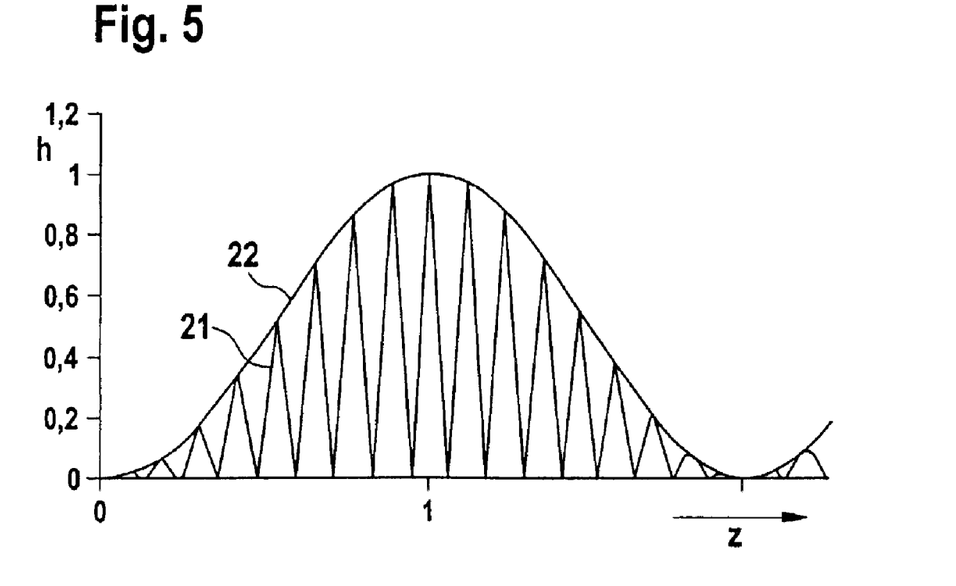
FIG. 5 shows the profile with another envelope curve.

FIG. 5 shows another profile 21 of the ZOM-structure 4' (FIG. 1) in which the sinusoidal grating structure $G(z)=$ $0.5 \cdot A \cdot [1+\sin(2\pi fz)]$ is modulated with the envelope curve 22 of the function $H(z)=\sin^2(2\pi Fz)$, wherein F is the frequency of the envelope curve 22. The profile 21 assumes the values of the function $S(z)=0.5 \cdot A \cdot [1+\sin(2\pi fz)]\sin^2(2\pi Fz)$.

Figure 6:
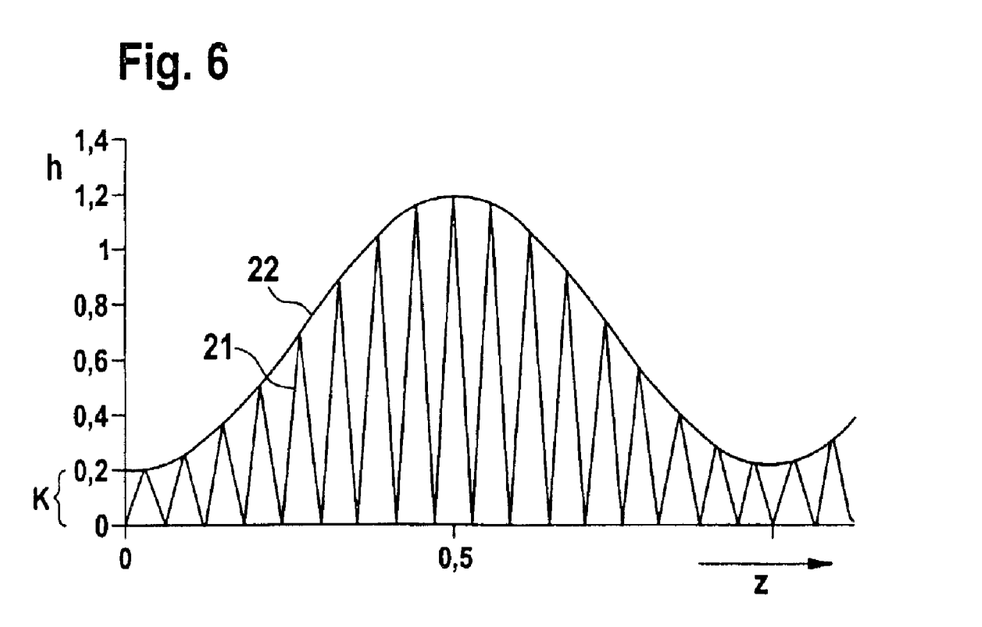
FIG. 6 shows the profile with the envelope curve with a constant term K.

FIG. 6 shows a function H(z) of the profile height h, which has a constant additive term K. The Figure shows the envelope curve 22 of the function $H(z)=\sin^2(2\pi Fz)+200$ nm. The profile 21 of the ZOM-structure 4' (FIG. 1) only attains the minimum profile height K=200 nm in the area 16 (FIG. 3). That minimum profile height K is selected from the range 0<K<300 nm. Any conceivable function suitable for modulation of the grating structure G(z) may have such an additive term K. The minimum profile height K in the region of at least 50 nm and better 100 nm to 200 nm prevents the occurrence of locations without an adequate profile. The locations without an adequate profile reflect the entire spectrum of the incident light. The area 16 with such a ZOM-structure 4' has regions of different colors which correspond to the different interference conditions. In the regions with the profile height h=K for example, the blue components are missing while with an increasing profile height h light of a longer and longer wavelength is faded out, for example green at h ~250 nm to 300 nm, so that an observer sees a purple color.

In general terms, for good observability of the surface pattern 18 (see FIG. 2), a slow change in the profile height h in the particular direction z is necessary, that is to say, the frequency F is to be selected to be much less than the spatial frequency f, while desirably the spatial frequency f is to be selected as greater than f=2400 periods/mm and the frequency F is to be selected from the range F<5 periods/mm. In the drawings in FIGS. 5 to 7 with the profiles 21 and the envelope curves 22, a period of the envelope curve 22, for reasons of illustration in the drawings, includes only a few periods of the profile 21 of the ZOM-structure 4'. In these examples, the profile height h is specified in micrometers and the distances in the direction z in millimeters. In reality, therefore, the spatial frequency f of the profile 21 is a multiple higher than the frequency F of the envelope curve 22, that is to say, the profile height h changes very slowly in dependence on the locus (x, y) except for individual non-uniformities. In the area 16 (FIG. 2) with the ZOM-structure 4', which is illuminated with daylight, the observer perceives a color or grey value which is adjusted according to the local value of the envelope curve 22. The periodicity of the envelope curve 22 thus produces a periodic pattern with the frequency F. So that the pattern can be readily perceived without aid, the period of the envelope curve 22 extends at least over 0.2 mm. A single period of the envelope curve 22 contains for each millimeter along a distance in the particular direction z the number of periods of the profile 21, which is specified by the spatial frequency f.

As stated above, the ZOM-structures 4' have a strong polarizing action. When viewing the ZOM-structure 4' in polarized light or when viewing through a polarization filter 31 (FIG. 1) and with illumination in unpolarized light, the pattern produced by the changing profile heights and/or profile shapes, in the area 16, is visible in an enhanced contrast or pronounced colors when the reflected TE-component of the light is eliminated by rotation of the polarization filter 31. For example, area portions 32 (FIG. 2) within the area 16 have such ZOM-structures (4') which differ from the ZOM-structure (4') of the remaining area 16 serving as a background surface, only by virtue of a different polarization capability. If the area portions 32 form an information-bearing code, for example in the form of a bar code, the code is not visible in light 10 (FIG. 1) which is incident in non-polarized mode as there is no contrast between the area portions 32 and the background surface of the area 16. It is only upon illumination with polarized light 10 that sufficient contrast occurs to recognize the area portions 32 of the code. Those codes are suitable for machine recognition. Instead of a code the information formed by a plurality of the area portions 32 is a script, a graphic emblem or an image. In an embodiment with a fine raster comprising the area portions 32, the information is introduced into the area 16, in which respect even grey levels of an image are reproduced by suitable graduations in the raster density.

Figure 7:
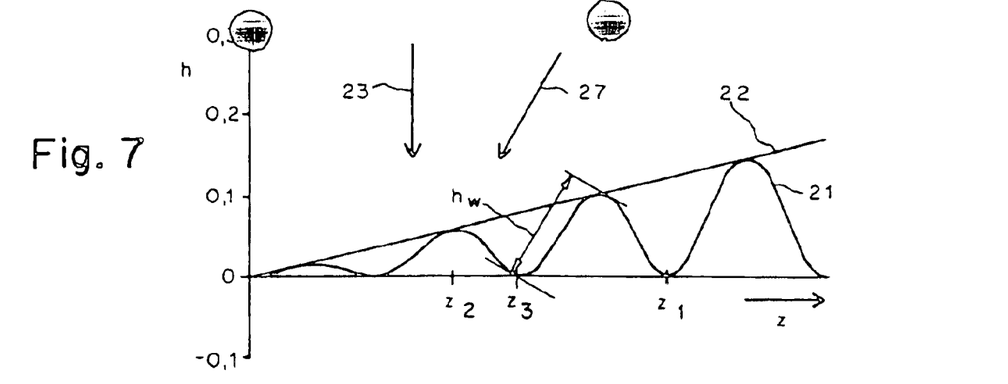
FIG. 7 shows the profile in the region of small profile heights.
Figure 8A:
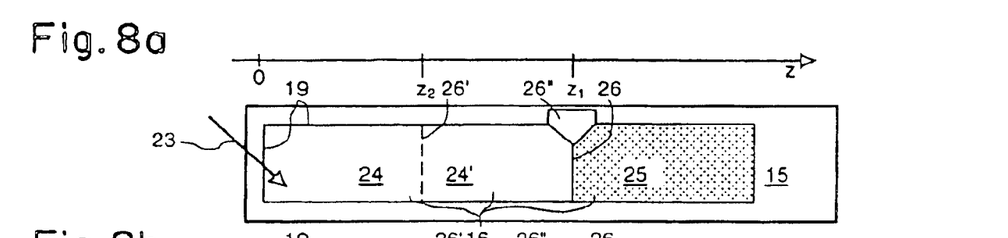
FIG. 8a shows an area in the region of small profile heights.
Figures 8B, 9:
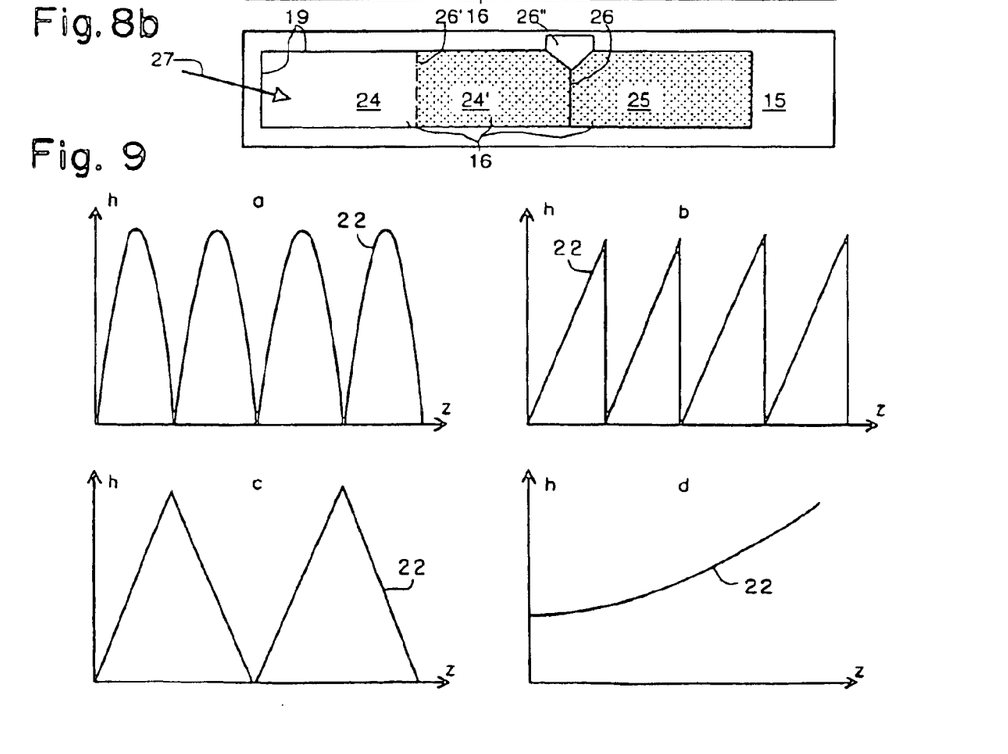
FIG. 8b shows the area from a different viewing direction.
FIG. 9 shows envelope curves.

If in a portion of the area 16 the profile height h only reaches a value in the range of 0 to 80 nm, the profile 21 in that portion of the area 16 is too little pronounced to have a diffraction effect. That portion of the area 16 therefore reflects the incident light 10 in dependence on the observation conditions. FIGS. 7, 8a and 8b, by means of a simple example, illustrate use of low-frequency modulation of the profile height h for the configuration of the surface pattern 18. FIG. 7 diagrammatically shows the profile 21 in the transitional region from the mirror to the effective interference structure in a cross-section through the ZOM-structure 4' (FIG. 1). It extends perpendicularly to the particular direction z, as is shown in a plan view on to the area 16 in FIGS. 8a and 8b. The area 16 with a part of its border 19 adjoins another surface portion, for example the optical-diffraction surface 15. If the observer in FIG. 8a is looking substantially perpendicularly on to the plane of the drawing in the observation direction 23 on to the ZOM-structure 4' (FIG. 1), over a distance of z=0 to z=$z_1$, the profile height h given by the envelope curve 22 (FIG. 7) is too small for the TM-polarized light to be noticeably weakened. In FIG. 8a, therefore, a sub-area 24 and an intermediate area 24' of the area 16 act like a mirror while a region 25 of the area 16 has profile heights h which are sufficiently great for interference colors and the area 25, as stated above, appears in color or in a grey shade or a mixed color. This is indicated in the drawing in FIGS. 8a and 8b by a dot raster. The profile height h in the region 25, at the boundary 26 to the intermediate area 24', reaches at least 80 to 100 nm, that is to say there for example the blue components are cancelled out of the white light. If the observer tilts the surface pattern 18 (FIG. 2) with the ZOM-structure 4' (FIG. 1) about an axis parallel to the grooves of the profile 21 (FIG. 7) into an inclined position, he notices that the region 25 expands at the cost of the intermediate area 24', the transition between the mirror and the interference colors shifts from the boundary 26 of z=$z_1$ to z=$Z_2$ to the dotted line 26', and reaches for example the sub-area 24. The observer is now looking inclinedly in a viewing direction 27 on to the profile 21. In FIG. 7, that causes an increase in the size of the profile height h to the effective profile height $h_w$ so that these interference effects also already occur at z=$z_2$ in the intermediate area 24' (FIG. 8b). The model of the profile height h, which is shown here, is only a heuristic one; the model cannot correctly reproduce the true circumstances in relation to sub-microstructures.

The above-described example is illustrated in FIGS. 8a and 8b. In the intermediate area 24', the profile height h of the ZOM-structure 4' rises from at most 50 run at the line 26' to at least 80 nm to 100 nm at the boundary 26 to the region 25. In the reflective sub-area 24, the profile height h=50 nm or less. In the region 25, the profile height h is at least 80 nm to 100 nm or more. If the observer looks in the direction of the arrow, the observation direction 23, in FIG. 8a, not only the sub-area 24 but also the intermediate area 24' is reflecting as the profile height h in the intermediate area 24' is too small. When the surface pattern 18 (FIG. 2) is tilted, having regard to the reflection condition in the viewing direction 27, the light 10 (FIG. 1) is more inclinedly incident on the surface pattern 18 (FIG. 2) and increases the profile height h, for example at the location $Z_3$ (FIG. 7) to the effective profile height $h_w$ (FIG. 7). In the intermediate area 24', that increase in the profile height h has the effect that during the tilting movement the transition from specular to colored reflection in the intermediate area 24' is displaced from the boundary 26 towards the line 26'. The dimensions of the elements 24, 24', 25 of the pattern, which are perceptible to the observer, are apparently dependent on the viewing direction 23, 27; those patterns with the reflecting surface portions 24, 24' and the moving transitions from specular to colored reflection fall into the group of moiré patterns. When the area 16 is rotated about the perpendicular line 11 (FIG. 1), the moiré pattern always remains visible, in contrast to the surface portions 15 with light-diffracting relief structures 4 (FIG. 1).

The moiré pattern in the security feature forms an additional obstacle to attempts to produce holographically generated copies of that security feature with a moiré pattern. The moiré pattern can be integrated without problem into the known surface patterns 18 (FIG. 2) of the kind set out in the opening part of the specification.

The area 16 advantageously has for example a marking surface 26' at the location for example of the maximum extent of the reflecting surface portions portions 24, 24' in order easily to recognize the displacement of the boundary 26 in the direction of the dotted line 26'. The marking surface 26' is occupied by diffracting, absorbing or scattering structures which for example light up or are readily visible. When in the intermediate area 24', the transition from specular to colored reflection is at the boundary 26 and/or at the location of the dotted line 26'.

Not only the sine function used above as an example but also other trigonometric functions such as $\sin^b(2\pi f z)$ with b=2, 3, 4, 5, ... or other periodic functions such as cycloids, rectangular functions or triangular functions, are suitable for the grating structure G(z). The cross gratings formed from those functions are to be particularly mentioned. Particularly for deep structures, a function $\sin^{b(z)}(2\pi f z)$ is suitable, in which b(z) is a function which is steady in a portion-wise manner.

The modulating envelope curve 22 of the profile 21 determines the observable patterns in the area 16. Besides the above-described functions, it is also possible to use the straight trigonometric functions $\sin^b(2\pi f z)$ with b=2, 4, ... and those shown in FIGS. 9a to 9d. FIG. 9a shows the function H(z)=|sin(2πFz)|, FIGS. 9b and 9c show linear periodic functions H(z) and FIG. 9d shows a non-periodic parabolic function H(z). The profile heights h are randomly selected and therefore the ordinate in FIG. 9 is not scaled.

The profiles 21 and the envelope curves 22 extend perpendicularly to the plane of the drawing in FIGS. 4 to 7 and 9 between the borders 19 of the area 16.

In quite general terms, the profile 21 of the ZOM-structures 4', S(x, y), is produced by modulation of the high-frequency grating structure G(x, y) with a modulating function H(x, y) of the profile height, which changes over several 1000 periods of the grating structure G(x, y) between a minimum and a maximum value: S(x, y)=G(x, y)·H(x, y), wherein the co-ordinates x and y identify a location in the area 16.

Figure 10:
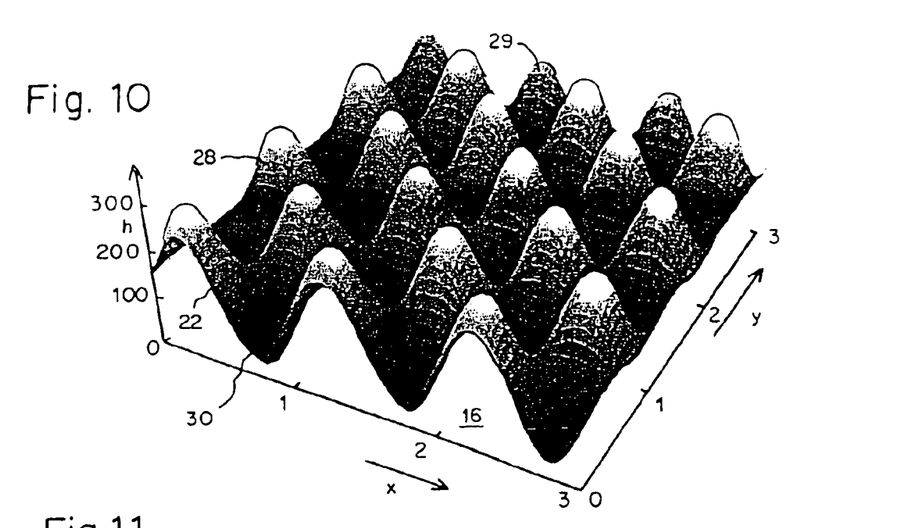
FIG. 10 shows the envelope curve surface for a chessboard pattern.

By way of example, FIG. 10 shows an envelope curve surface 28 which in terms of its shape reminds us of an egg carton. The envelope curve surface 28 contains all envelope curves 22 in the area 16 and determines the profile height h at each location which is established by the co-ordinates x, y. The identified envelope curve 22 has the function H(x, y=0). The envelope curve surface 28 is described by the function:

$$H(x, y) = \sin(2\pi Fx) \cdot \sin(2\pi Fy) + K \text{(FIG. 6)}$$

and modulates by way of example the grating structure $G(x, y) = 0.5 \cdot A \cdot [1+\sin(2\pi fx)] \cdot [1+\sin(2\pi fy)]$ so that the ZOM-structure 4' (FIG. 1) has the function $$S(x,y) = 0.5 \cdot A \cdot [1+\sin(2\pi fx)][1+\sin(2\pi fy)] \sin(2\pi Fx) \cdot \sin(2\pi Fy) + K.$$

That ZOM-structure 4' comprises fine, regularly arranged needles whose length is determined by the envelope curve surface 28. Under diffuse illumination, a chessboard-like moiré pattern becomes visible, in which respect hills 29 stand out from valleys 30 in respect of color and/or in the grey values. In this case also, the colors and grey values change when the area 16 is tilted but not when the area 16 is rotated about the perpendicular line 11. If the term K<50 nm, the bottoms of the valleys 30 reflect. The shift of the transition from specular to colored reflection when the area 16 is tilted is also to be observed in the region of the inclines of the envelope curve surface 28 in the chessboard-like moiré pattern.

In another embodiment, the ZOM-structure 4' has a relief with the profile 21 (FIG. 4) in accordance with the function S(x, y), wherein S(x, y) is an additive superimposition of two periodic functions G1(x, y) and G2(x, y): The function G1(x, y) is sinusoidal, is of the amplitude A and determines the spatial, frequency f of the ZOM-structure 4'. The second function G2(x, y, θ) is the first harmonic in relation to G1(x, y) and is of the amplitude A/2. The function G2(x, y, θ) is displaced by a phase θ with respect to the function G1(x, y). In the general form $$S(x, y) = G1(x, y) + G2(x, y).$$

In the particular direction z, the function S of the ZOM-structure 4' reads:

$$S(z) = A \cdot \{[1+\sin(2\pi fz)] + 0.5 \cdot [1+\sin(4\pi fz + \theta)]\}.$$

Figure 11:
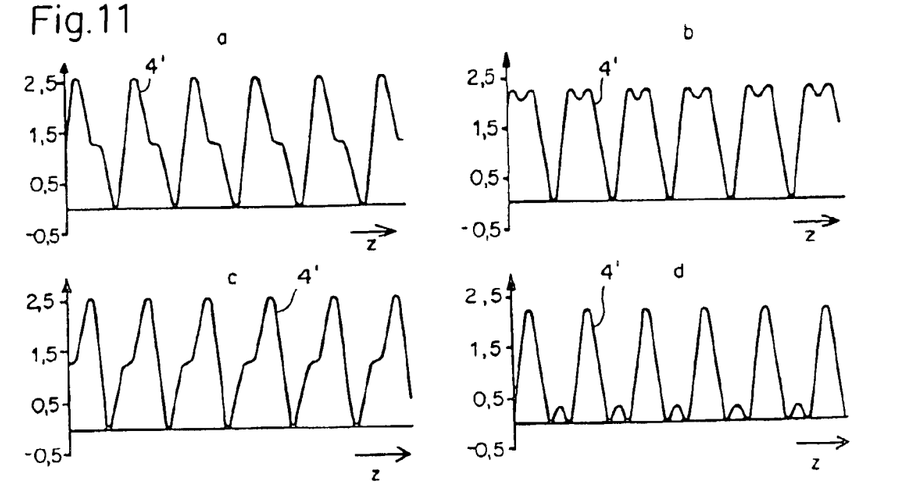
FIG. 11 shows symmetrical and asymmetrical profiles.

FIGS. 11a to 11d and 12 show the profile 21 (FIG. 7) as a function along the direction z, wherein the ordinate h is scaled in arbitrary units. The value of the phase shift θ determines whether the ZOM-structure 4' is symmetrical, as shown in FIGS. 11b and 11d (for θ=90° and 270° respectively) or asymmetrical, as shown in FIGS. 11a and 11c (for θ=0° or 180° respectively). The grating vectors of the functions G1(x, y) and G2(x, y) are parallel or include an angle with an absolute magnitude of less than 10°.

Figure 12:
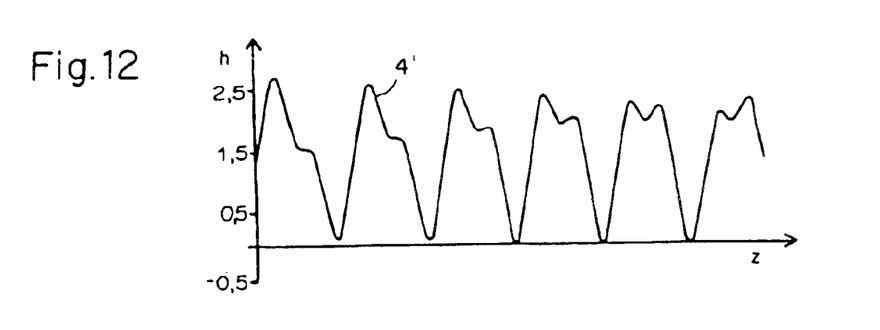
FIG. 12 shows a profile shape which changes along a direction.

In another embodiment of the ZOM-structure 4', the phase shift θ is a periodic or at least a portion-wise steady function θ(x, y) of the location in the area 16 (FIG. 10). The function θ(x, y) changes very slowly in comparison with the spatial frequency f in the direction z, for example in the range of 90°/mm to 720°/mm. The function θ(x, y) modulates the profile shape of the ZOM-structure 4' and thus has an effect comparable to the function of the envelope curve 22 (FIG. 5). FIG. 12 shows a local variation in the curve shape of the ZOM-structure 4' as a function of the particular direction z. In the case of the periodic function θ(x, y), the phase shift θ changes through 360° over a number of N periods of the ZOM-structure 4' with the spatial frequency f. The pattern which occurs upon illumination of the ZOM-structure 4' is thus repeated at spacings of N/f mm.

The range of profile heights h which can be achieved for ZOM-structures 4' depends on the spatial frequency f as an inexpensive multiplication, that is to say replication of the ZOM-structure 4' in the cover layer 2 (FIG. 1), becomes correspondingly more difficult, the higher the spatial frequency f is. The profile heights which can be produced nowadays are in the range of h=0.5/f to 4/f. With a spatial frequency of f=3000 periods/mm, the profile heights h are in the range of 150 nm to 1200 nm. Typical values for the profile heights h are between 200 nm and 400 nm at a spatial frequency f of 3000 periods/nm.

The observation condition for the observer changes if the surface pattern 18 (FIG. 2) is tilted about an axis in the plane of the surface pattern 18 or is rotated about the perpendicular line 11 (FIG. 1). Likewise, the quality of the incident light, color, polarization and so forth or viewing of the surface pattern 18 through a polarization filter 31 (FIG. 1) and rotation of the polarization filter 31 influence the observation condition.

What is claimed is:

1. A surface pattern with a visually visible mosaic comprising first surface portions and second surface portions embedded in a laminate of at least a transparent cover layer and a protective layer, wherein the first surface portions are in the form of transparent windows and the second surface portions which are at least partially covered with a reflection layer are in the form of mirror surfaces, optical-diffraction surfaces with microscopic relief structures and surface portions which scatter incident light beams, wherein for a predetermined limit wavelength ($\lambda_G$) of the violet part of the visible spectrum at least in one of the optical-diffraction surfaces in an area defined by co-ordinates x and y, the microscopic relief structure is in the form of a zero order microstructure (ZOM-structure) and is of a spatial frequency (f) such that the product (P) of the limit wavelength ($\lambda_G$) and the spatial frequency (f) is greater than or equal to 1, in the other optical-diffraction surfaces the spatial frequencies (f) of the other microscopic relief structures satisfy the condition that the product (P) is less than 1, and in each location defined by the co-ordinates (x, y) in the area a profile height (h) of the ZOM-structure is optically effective, wherein a grating structure (G{x, y}) of the ZOM-structure is modulated by means of a low-frequency envelope curve surface (H{x, y}) at a frequency (F), wherein the frequency (F) is less than five periods per millimeter.

2. A surface pattern according to claim 1, wherein the envelope curve surface (H{x, y}) determines values for the profile height (h) from the range 0 nm to a maximum value which is between 150 nm and 1200 nm and that the area with the ZOM-structure has reflecting sub-areas.

3. A surface pattern according to claim 1, wherein the envelope curve surface (H{x, y}) has values for the profile height (h) an additional constant term with a value K from the range of 50 nm to 200 nm, that the envelope curve surface (H{x, y}) assumes values for the profile height (h) from the range K to a maximum value which is higher than 150 nm but less than 1200 nm, and that the area with the ZOM-structure does not have any reflecting sub-areas.

4. A surface pattern according to claim 2, wherein the envelope curve surface (H{x, y}) is a periodic trigonometric function.

5. A surface pattern according to claim 1, wherein the envelope curve surface (H{x, y}) is a periodic function composed of linear portions.

6. A surface pattern according to claim 1, wherein the low-frequency envelope curve surface (H{x, y}) along a particular direction (z) is a one-dimensional function (H{z}) such that the area has a strip-shaped color and/or grey value pattern in the reflected light.

7. A surface pattern according to claim 1, wherein the low-frequency envelope curve surface (H{x, y}) is a product of a sub-function (H1) which changes only in the direction of the one co-ordinate (x) and a sub-function (H2) which changes only in the direction of the other co-ordinate (y) such that the area has a chessboard-like regular color and/or grey value pattern in the reflected light.

8. A surface pattern according to claim 6, wherein the dimensions of the color and/or grey values of the pattern are dependent on the observation conditions and are variable by tilting about an axis in the plane of the area.

9. A surface pattern according to claim 1, wherein a period of the envelope curve surface (H{x, y}) includes a number of M periods of the ZOM-structure with the spatial frequency (f) and that the pattern is repeated at a spacing of M/f mm.

10. A surface pattern according to claim 1, wherein the grating structure (G{x, y}) is proportional to the function $\sin^{b(z)}(2\pi f z)$, wherein b(z) is at least a portion-wise steady function in a particular direction (z) in the area defined by the co-ordinates (x; y).

11. A surface pattern according to claim 2, wherein the area with the envelope curve surface (H{x, y}) is juxtaposed to a surface portion which scatters the incident light and the profile height (h) of the envelope curve surface (H{x, y}) changes along a border between the area and the surface portion from a value (h)=0 to a value (h)=300 nm.

12. A surface pattern according to claim 7, wherein the dimensions of the color and/or grey values of the pattern are dependent on the observation conditions and are variable by tilting about an axis in the plane of the area.

13. A surface pattern with a visually visible mosaic comprising first surface portions and second surface portions embedded in a laminate comprising a transparent cover layer and a protective layer, wherein the first surface portions are in the form of transparent windows and the second surface portions are at least partially covered with a reflection layer and are in the form of mirror surfaces, optical diffraction surfaces with microscopic relief structures and surface portions which scatter incident light beams, wherein for predetermined limit wavelength (c) of the visible spectrum at least in one of the optical-diffraction surfaces in an area defined by co-ordinates x and y, the microscopic relief structure is in the form of a zero-order-microstructure (ZOM-structure) and is of a spatial frequency (f) such that the product (P) of the limit wavelength ($\lambda_G$) and the spatial frequency (f) is greater than or equal to 1, in the other optical-diffraction surfaces, the spatial frequencies (f) of the other microscopic relief structures satisfy the condition that the product (P) is less than 1, in each location defined by the co-ordinates (x, y) in the area, a profile height (h) of the ZOM-structure is optically effective, wherein a grating structure (G{x, y}) of the ZOM-structure is modulated by means of a low-frequency envelope curve surface (H{x, y} at a frequency (F), wherein the frequency (F) is less than five periods per millimeter, and wherein the low frequency envelope curve surface (H{x, y}) is a product of a sub-function (H1) which changes only in the direction of the one co-ordinate (x) and a sub-function (H2) which changes only in the direction of the other co-ordinate (y) such that the area has a chessboard-like regular color and/or grey value pattern in the reflected light.

14. A surface pattern according to claim 13, wherein the dimensions of the color and/or grey values of the pattern are dependent on the observation conditions and are variable by tilting about an axis in the plane of the area.

15. A surface pattern according to claim 13, wherein the envelope curve surface (H{x, y}) determines values for the profile height (h) from the range 0 nm to a maximum value which is between 150 run and 1200 nm and that the area with the ZOM-structure has reflecting sub-areas.

16. A surface pattern according to claim 15, wherein the area with the envelope curve surface (H{x, y}) is juxtaposed to a surface portion which scatters the incident light and the profile height (h) of the envelope curve surface (H{x, y}) changes along a border between the area and the surface portion from a value (h)=0 to a value (h)=300 nm.

17. A surface pattern according to claim 13, wherein the envelope curve surface (H{x, y}) has values for the profile height (h) with an additional constant term K having a value K from the range of 50 nm to 200 nm, and the envelope curve surface (H{x, y}) assumes values for the profile height (h) from the range K to a maximum value which is higher than 150 nm but less than 1200 nm, so that the area with the ZOM-structure does not have any reflecting sub-areas.

18. A surface pattern according to claim 13, wherein the envelope curve surface (H{x, y}) is a periodic trigonometric function.

19. A surface pattern according to claim 13, wherein the envelope curve surface (H{x, y}) is a periodic function composed of linear portions.

20. A surface pattern according to claim 13, wherein a period of the envelope curve surface (H{x, y}) includes a number of M periods of the ZOM-structure with the spatial frequency (f) and that the pattern is repeated at a spacing of M/f millimeters.

* * * * *